United States Patent
Okawa et al.

(10) Patent No.: US 6,255,664 B1
(45) Date of Patent: Jul. 3, 2001

(54) SENSOR FOR MEASURING DEGREE OF FLATNESS

(75) Inventors: Shinji Okawa, Gumma (JP); Robert C. Abbe, Newton, MA (US)

(73) Assignees: Super Silicon Crystal Research Institute Corp., Gumma (JP); ADE Corporation, Westwood, MA (US)

( * ) Notice: Subject to any disclaimer, the term of this patent is extended or adjusted under 35 U.S.C. 154(b) by 0 days.

(21) Appl. No.: 09/286,712

(22) Filed: Apr. 5, 1999

(30) Foreign Application Priority Data

Dec. 16, 1998 (JP) .................................... 10-358116

(51) Int. Cl.[7] .................................................. G01B 11/24
(52) U.S. Cl. ..................................... 250/559.22; 324/662
(58) Field of Search ..................... 250/559.22; 356/237.2, 356/376, 371; 324/662, 671; 170/166, 167, 170

(56) References Cited

U.S. PATENT DOCUMENTS

| | | | | |
|---|---|---|---|---|
| 4,183,060 | * | 1/1980 | Barnett et al. | 324/61 QS |
| 4,476,430 | * | 10/1984 | Wright et al. | 324/61 R |
| 4,491,787 | * | 1/1985 | Akiyama et al. | 324/61 P |
| 4,560,924 | * | 12/1985 | Nordberg | 324/61 R |
| 6,062,948 | * | 5/2000 | Schiff et al. | 356/371 |

* cited by examiner

*Primary Examiner*—Stephone B. Allen
(74) *Attorney, Agent, or Firm*—Weingarten, Schurgin, Gagnebin & Hayes LLP

(57) ABSTRACT

A sub sensor for measuring a small area is integrally incorporated in a main sensor for measuring a large area and a part in the vicinity of the edge of a wafer is measured by the sub sensor, while a center of a wafer is measured by the main sensor.

6 Claims, 1 Drawing Sheet

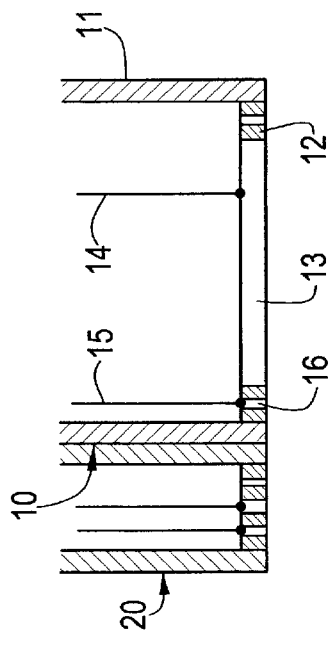
FIG. 2
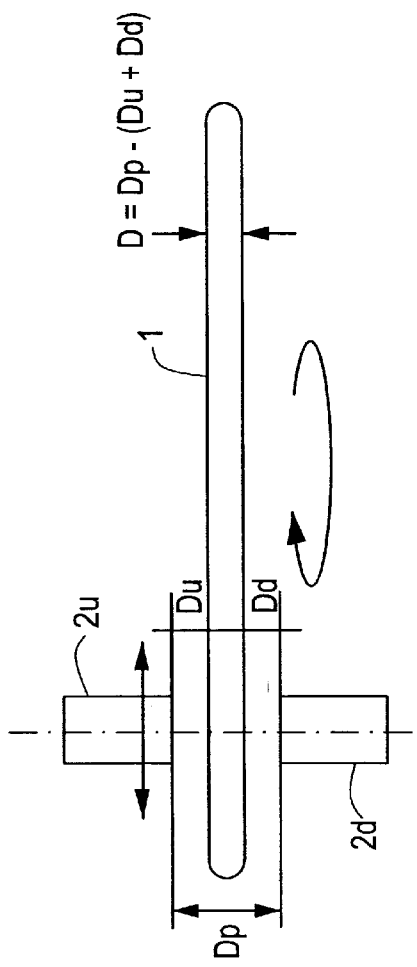
FIG. 1
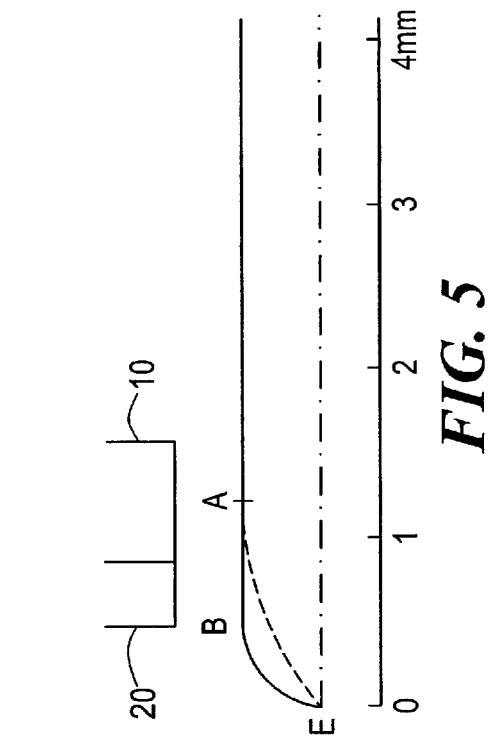
FIG. 5
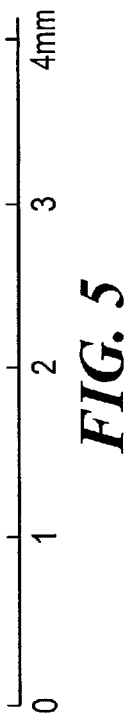
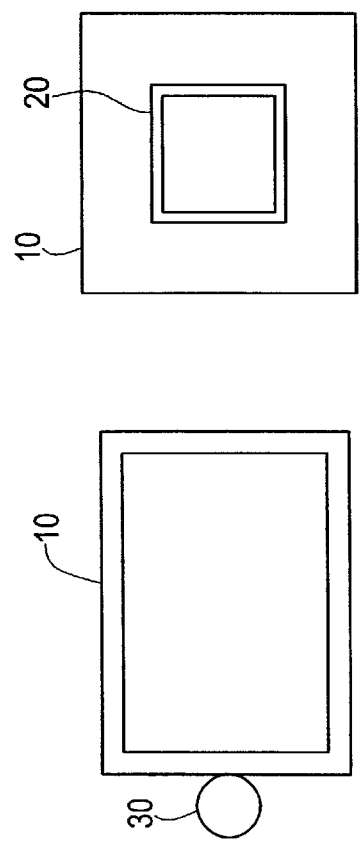
FIG. 4
FIG. 3

SENSOR FOR MEASURING DEGREE OF FLATNESS

BACKGROUND OF THE INVENTION AND RELATED ART STATEMENT

<Industrial Application Field>

The present invention relates to a sensor for measuring the degree of flatness of a wafer, disc or the like capable of measuring nearly edge peripheries thereof.

In regard to substrates of semiconductor wafer, optical disc, hard disc and others, conditions in the degree of flatness of the substrates are taken as important. In particular, in the wafer of semiconductor where many chips are cut from a one sheet of wafer, it is desirable to use the wafer nearly the edge thereof as possible in order to widen an available area of the wafer to be chips. For example, when chips of 25 mm×40 mm in size are cut from the wafer of 300 mm diameter, in case of leaving a remainder of 3 mm, number of 50 devices can be produced, but if a remainder to be left is 1 mm, 54 devices may be got out.

For using the wafer including the edge periphery to yield chip products, it is required to measure the degree of flatness of the wafer or disc up to the edges as nearly as possible. In the present invention, the degree of flatness is defined in term of the deviation in thickness from the surface to the reverse side of the wafer or disc.

When the degree of flatness of the semiconductor wafer is measured, sensors $2u$, $2d$ are faced to both sides of the wafer 1 turnably held as shown in FIG. 1, and distances Du, Dd from the sensors $2u$, $2d$ to the surface of the wafer 1 are measured. As the distance Dp between the sensors $2u$, $2d$ is in advance known, the thickness D of the wafer 1 is given as D=Dp−(Du+Dd). If the sensors $2u$, $2d$ are moved to the radius of the wafer 1 as rotating the wafer 1, the moving loci of the sensors $2u$, $2d$ are made helical above the wafer 1, and the thickness D over an almost overall surface of the wafer 1 may be measured and the flatness is calculated.

Ones known as the sensors $2u$, $2d$ are a sensor of capacitance for measuring variations in capacitance between the wafer 1 and the sensor $2u$, $2d$, or an optical sensor for measuring a distance from the wafer 1 to the sensors $2u$, $2d$ by means of a laser beam irradiated to and reflected on the surface of the wafer 1.

<Problems to be Solved by the Invention>

Depending on the sensor of capacitance, a measured result is obtained as an average value in the surface area of the wafer which the measuring part of the sensor opposes and it has a high value in reproductivity. If a sensor whose measuring part has a large scope is used, a time of operating the whole surface of the wafer is saved and the reproductivity is further heightened.

However, the wafer to be measured is chamfered and inclined at the edge part thereof. If the measuring part of the sensor faces this inclined portion, or one portion of the measuring part deviates from the edge, a measured value calculated by the capacitance is less than actual data. It is, therefore, necessary to oppose the measuring part of the sensor to the surface of the wafer so that the measuring part does not enter the edge part. Namely, the degree of flatness of the wafer is measured, leaving an insensitive zone depending on the area of the measuring part and existing around the periphery of the wafer, and such a part excepting the insensitive zone is cut to chips.

For increasing the significant area of the wafer to be used as chips, the width of the insensitive zone present at the wafer periphery should be lessened as narrow as possible.

Specifically, assuming that the wafer of the chamfered width being 0.5 mm is measured with the sensor of capacitance of a size being 4 mm×4 mm, the reliability of data is lowered in the peripheral part inside 2.5 mm or more than the edge. This system can be employed in the present exception of the edge being determined at 3 mm, but cannot be responded to an inclination that the exception of the edge is made smaller for increasing the yield.

On the other hand, the optical sensor is suitable for measuring a minute small area, and can measure nearly the edge. However since an object to be measured is a spot of about 1 to 2 μm diameter, it is practically impossible to measure the full surface of the wafer, and several points in the wafer surface cannot but be sampling-measured. Therefore, the reliability or reproductivity of measured results are low.

Such problem occurs not only in the semiconductor wafer but also in the optical disc, hard disc or such where the surface condition is regarded as important.

SUMMARY OF THE INVENTION

The present invention has been devised to solve such problem and it is an object to give a function capable of measuring both large and small areas to the sensor, thereby to measure the degree of flatness of the wafer in the vicinity of the edge part exactly and in short time.

For accomplishing this object, the sensor for measuring the degree of flatness is characterized in that the sub sensor for measuring the small area is united in the main sensor of capacitance for measuring the large area.

The sub sensor is united in the main sensor such that the main sensor and the sub sensor are on the same axis. Otherwise, the sub sensor is incorporated in the center of the main sensor.

For the main sensor, the sensor of capacitance which can obtain measured results of high reproductivity, is employed. For the sub sensor, used are the sensor of capacitance of smaller size than that of the main sensor, or the optical sensor which measures the surface area in spotting.

BRIEF DESCRIPTION OF THE DRAWINGS

FIG. 1 is an elevation view of a device of measuring the degree of flatness where the sensors are opposed to both sides of the wafer;

FIG. 2 is an elevation view of a sensor of measuring the degree of flatness where the sub sensor is united in the main sensor;

FIG. 3 is a plan view of a sensor of measuring the degree of flatness where the optical sensor as the sub sensor is incorporated in the main sensor;

FIG. 4 is a plan view of a sensor of measuring the degree of flatness where the sub sensor is incorporated in the center of the main sensor; and FIG. 5 is an explanatory view for explaining merits of additionally providing the sub sensor.

DETAILED DESCRIPTION OF PREFERRED EMBODIMENTS

The sensor according to the present invention integrally incorporates the sub sensor 20 for measuring the small area in the main sensor 10 for measuring the large area as shown in FIG. 2.

As the main sensor 10, the sensor of capacitance having the same structure as a prior art is employed. Specifically, a measuring electrode 13 is mounted on a shielding case 11 via an insulating member 12. The measuring electrode 13 is connected to a detector through a leader wire 14. The circumference of the measuring electrode 13 is enclosed with guard ring 16 connected to an earth cable 15 for cutting off disturbances.

As the sub sensor 20, used are the sensor of capacitance for measuring the small area having the same structure as the main sensor 10, or an optical sensor 30 (FIG. 3) suitable for measuring a minute area. The sensor integrally incorporated with the main sensor 10 and the sub sensor 20, as explained in FIG. 1, moves to the radius of the wafer 1 under rotation, and scans all over the surface of the wafer 1 as drawing a helical locus, when relatively seeing.

Since the sub sensor 20 moves along the same straight line as that of the main sensor 10, the sub sensor 20 is preferably unitary with the main sensor 10 such that the center line of the main sensor 10 accords with the center line of the sub sensor 20. Namely, for measuring the overall surface of the wafer 1, it is necessary to scan the wafer 1 while moving the sensor on the radius passing the center of the wafer. If an off-set exists between the main sensor 10 and the sub sensor 20, the center of either off-set one of the sensors 10 or 20 cannot be measured. Otherwise, as shown in FIG. 4, the sub sensor 20 may be incorporated in the center of the main sensor 10.

Apart near the edge of the wafer 1 is measured by the sub sensor 20, while a center thereof is measured by the main sensor 10.

The edge portion of the chamfered wafer 1 is, as shown by enlarging in FIG. 5, inclined from an edge E to a bevel starting point B, and the width E-B of the chamfered portion is generally determined to be around 0.5 mm. When measuring the edge portion with the sensor of capacitance, a point A where the measuring electrode 13 does not enter the bevel starting point B is determined to be a measuring critical point, and the width E-A is an insensitive zone.

When the part in the vicinity of the edge portion of the wafer 1 having such a chamfered part is measured with the sensor of 4 mm×4 mm, there occurs an insensitive zone having the width of 2.5 mm by adding the edge width E-B of 0.5 mm to the center distance of the sensor being 2 mm.

In contrast, if using the sensor where the sub sensor of 2 mm×2 mm is incorporated in the main sensor of 4 mm×4 mm, there occurs an insensitive zone having the width of 1.5 mm by adding the edge width E-B of 0.5 mm to the center distance of the sub sensor 20 being 1 mm. In other words, if the part in the vicinity of the edge is measured by the sub sensor 20, the width of the insensitive zone E-A becomes narrower from 2.5 mm to 1.5 mm, so that the area of the wafer 1 available for cutting chips is widened by such a narrower part. If, as the sub sensor, using the optical sensor 30 (FIG. 3) of small spot diameter, the measuring critical point A can be brought nearer to the beveling definition B, thereby widening an available area of the wafer 1. In addition, since the center part of the wafer 1 is measured with the main sensor 10, extension of a measuring time may be controlled.

The sub sensor 20 may be also used for measuring the center of the wafer 1. Namely, since the sub sensor 20 deals with the measuring of the small area, it may be also used for variations in roughness in the surface. In this case, when both measured results obtained by the main sensor 10 and the sub sensor 20 are processed by a calculator, the data of the degree of flatness and the variation in roughness are obtained by once measurement.

In the sensor (FIG. 4) where the sub sensor 20 is incorporated in the center of the main sensor 10, the same points may be concurrently measured without receiving influences of changes of measuring atmosphere (moisture, air flowing and others), so that measured results of high reliability are obtained. Further, when the wafer 1 where the flatness degree is measured is turnably supported within a vertical face, and the wafer 1 is scanned over the surface thereof with the sensors facing the surface and the reverse side of the wafer at the left and the right sides, influences such as bending deformation of the wafer 1 by gravity are removed, so that the measured results of high reliability are obtained.

Thus, when the part in the vicinity of the edge of the wafer 1 is measured by the sub sensor 20 and the center thereof is measured by the main sensor 10, the flatness degree of the wafer 1 may be measured over the abroad area, and the measuring time is shortened.

<Effects of the Invention>

As explained above, the sensor for measuring the degree of flatness according to the present invention has the structure incorporating the sub sensor in the main sensor, whereby the sub sensor dealing with the measuring of the small area measures the part near the edge part of the wafer. Accordingly, the width of the insensitive zone can be made narrower in accordance with the size of the sub sensor, and the yield of the wafers to be cut into chips can be heightened, and the area of the available application can be widened.

The entire disclosure of Japanese Patent Application No.10-358116 filed on Dec. 16, 1998, including specification, claims, drawings and summary is incorporated herein by reference in its entirety.

What is claimed is:

1. A sensor for measuring the degree of flatness comprising;
    a main sensor of capacitance for measuring a large area, and
    a sub sensor for measuring a small area united in said main sensor.

2. The sensor for measuring the degree of flatness as set forth in claim 1, wherein a center line of said main sensor and a center line of said sub sensor are on the same axis.

3. The sensor for measuring the degree of flatness as set forth in claim 1, wherein said sub sensor is incorporated in the center of said main sensor.

4. The sensor for measuring the degree of flatness as set forth in claim 1, wherein an optical sensor is used as the sub sensor.

5. The sensor for measuring the degree of flatness as set forth in claim 2, wherein an optical sensor is used as the sub sensor.

6. The sensor for measuring the degree of flatness as set forth in claim 3, wherein an optical sensor is used as the sub sensor.

* * * * *